United States Patent [19]

Lamers et al.

[11] Patent Number: 5,429,674

[45] Date of Patent: Jul. 4, 1995

[54] N-ACYL AMINOMETHYLENE PHOSPHONATES AND THEIR USE IN WATERBORNE COATING COMPOSITIONS

[75] Inventors: Paul H. Lamers, Allison Park; Kurt G. Olson; James E. Poole, both of Gibsonia; Douglas W. Maier, Wexford, all of Pa.

[73] Assignee: PPG Industries, Inc., Pittsburgh, Pa.

[21] Appl. No.: 304,050

[22] Filed: Sep. 12, 1994

[51] Int. Cl.⁶ .............. C09C 1/62; C09C 1/64; C09C 3/08

[52] U.S. Cl. .............. 106/404; 106/14.12; 106/14.15; 106/287.24; 106/287.25; 106/499; 106/503; 106/403; 252/389.21; 252/400.21; 252/400.22; 558/155; 558/158; 558/169; 562/15; 562/16

[58] Field of Search .............. 558/155, 158, 169; 562/15, 16; 252/400.21, 400.22, 389.21; 106/14.12, 14.15, 287.24, 287.25, 403, 404, 499, 503

[56] References Cited

U.S. PATENT DOCUMENTS

| | | | |
|---|---|---|---|
| 4,621,112 | 11/1986 | Backhouse et al. | 524/145 |
| 4,675,358 | 6/1987 | Frangou | 524/439 |
| 4,851,159 | 7/1989 | Fields et al. | 562/17 |
| 4,916,176 | 4/1990 | Vachlas et al. | 524/140 |
| 5,034,556 | 7/1991 | Kahle, II | 558/155 |
| 5,041,627 | 8/1991 | Baysdon et al. | 562/16 |
| 5,057,156 | 10/1991 | Kuwajima et al. | 106/503 |
| 5,233,080 | 8/1993 | Heinsohn | 562/15 |

FOREIGN PATENT DOCUMENTS

| | | | |
|---|---|---|---|
| 0537786A1 | 4/1993 | European Pat. Off. | C07F 9/38 |
| 1380675 | 1/1975 | United Kingdom | C07F 9/38 |

*Primary Examiner*—Mark L. Bell
*Assistant Examiner*—Scott L. Hertzog
*Attorney, Agent, or Firm*—Krisanne Shideler; William J. Uhl

[57] ABSTRACT

N-acyl aminomethylene phosphonates are provided having a group defined by the following general formula:

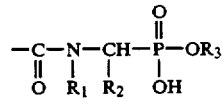

wherein $R_1$ is hydrogen, an aliphatic radical having 1 to 25 carbon atoms, or an aromatic radical having 6 to 25 carbon atoms; $R_2$ is hydrogen, an aliphatic radical having 1 to 25 carbon atoms, or an aromatic radical having 6 to 25 carbon atoms; and $R_3$ is a group remaining after reaction of a hydroxyl group-containing or epoxy group-containing polymer with an acidic hydrogen of a

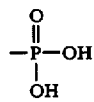

group. Also provided are waterborne coating compositions containing metallic pigments which are normally reactive with water or moisture to release hydrogen gas, stabilized against gassing by incorporation of these N-acyl aminomethylene phosphonates into the waterborne coating compositions.

14 Claims, No Drawings

N-ACYL AMINOMETHYLENE PHOSPHONATES AND THEIR USE IN WATERBORNE COATING COMPOSITIONS

FIELD OF THE INVENTION

The present invention relates to waterborne coating compositions containing metallic pigments which are normally reactive with water or moisture to release hydrogen gas, stabilized against gassing by addition of certain N-acyl aminomethylene phosphonates to these waterborne coating compositions, and to the N-acyl aminomethylene phosphonate gassing inhibitors themselves.

BACKGROUND OF THE INVENTION

Automotive coatings containing metallic pigments such as aluminum flake are generally used to obtain the glossy lustrous appearance which is currently in-demand in the automotive market. There has been a effort in the automotive industry to reduce atmospheric pollution due to volatile solvents emitted during the painting process without sacrificing the appearance of the coating system. One approach to this end has been to develop waterborne coating compositions. Waterborne coating compositions, however, are not without disadvantages. For example, aluminum flakes which are used in metallic paints react with water and release hydrogen gas, resulting in unstable compositions.

Prior art efforts to minimize this aluminum-water reaction include treatment processes such as solvent and chromium treatments that render the aluminum surface substantially inert. Chromium treated aluminum pigments are available from Obron Atlantic Corporation under the trademark Stapa Hydrolux. Coatings made with chromium treated aluminum flake pigment are stable with respect to gassing, but the treated aluminum pigment is very expensive.

U. S. Pat. Nos. 5,034,556 and 5,091,451 disclose reaction products of alpha-aminomethylene phosphonic acids and epoxy compounds and their use in metallic pigment-containing aqueous coating compositions as gassing inhibitors. However, these coating compositions, although essentially non-gassing, exhibit marginal pump stability; that is, the high shear stresses to which the composition is subjected during pumping through equipment cause the composition to break down somewhat, losing some of its rheological properties. The resulting coating has poor appearance properties.

U. S. Pat. No. 4,621,112 discloses reaction products of orthophosphoric acid and monoesters thereof with epoxy compounds and their use in metallic pigment-containing coating compositions as gassing inhibitors. However, such compositions exhibit only marginal gassing resistance.

British Patent 1380675 discloses N-acyl aminomethylene phosphonates and their use as flame proofing agents. The British reference does not teach nor suggest the use of such compounds in waterborne coating compositions as gassing inhibitors.

It would be desirable to provide a waterborne coating composition containing metallic pigments which is stabilized against gassing by including an inexpensive organic additive which does not make the coating composition shear sensitive, so as to result in good pump stability.

SUMMARY OF THE INVENTION

In accordance with the present invention, N-acyl aminomethylene phosphonates are provided having the following general formula:

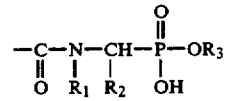

wherein $R_1$ is hydrogen, an aliphatic radical having 1 to 25 carbon atoms or an aromatic radical having 6 to 25 carbon atoms; $R_2$ is hydrogen, an aliphatic radical having 1 to 25 carbon atoms, or an aromatic radical having 6 to 25 carbon atoms. By aliphatic is meant saturated and unsaturated aliphatic and cycloaliphatic. Preferably, the aliphatic radical is alkyl. Preferably, the aromatic radical is phenyl. Also, by aliphatic and aromatic is meant unsubstituted aliphatic and aromatic and substituted aliphatic and aromatic in which the substituents do not adversely affect the reactions of the precursor compounds which occur to form the N-acyl aminomethylene phosphonates and do not adversely affect the performance of the N-acyl aminomethylene phosphonates as stabilizers in waterborne coating compositions. Examples of substituents include hydroxyl, carboxy, alkoxy, hydroxyalkoxy, amino and nitro. Examples of other substituents include alkyl and substituted alkyl substituents for the aromatic radicals, i.e., $R_1$ and/or $R_2$ are arylalkyl groups and aryl and substituted aryl substituents for the alkyl group, i.e., $R_1$ and/or $R_2$ are alkaryl groups. $R_3$ is hydrogen or a group remaining after reaction of a hydroxyl group-containing or epoxy group-containing polymer with an acidic hydrogen of a

group.

Typically, the N-acyl aminomethylene phosphonates have the following general formula:

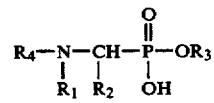

wherein $R_1$, $R_2$, and $R_3$ are as defined above; and $R_4$ is a group remaining after reaction of a member selected from the group consisting of an anhydride, a lactone, or monoisocyanate, including mixtures thereof, with the amino hydrogen of a

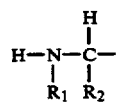

group.

Also provided are waterborne coating compositions containing metallic pigments and an N-acyl aminomethylene phosphonate having the structures described above.

DETAILED DESCRIPTION

Preferably, the N-acyl aminomethylene phosphonates of the present invention have the following general formula:

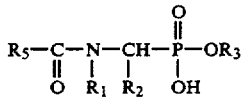

wherein $R_1$, $R_2$ and $R_3$ are as defined above, and $R_5$ is an aliphatic radical having 1 to 25 carbon atoms or an aromatic radical having 6 to 25 carbon atoms, or an aliphatic or an aromatic substituted amino radical in which the aliphatic group contains from at least one, preferably 1 to 25 carbon atoms and the aromatic group contains from at least 6, preferably 6 to 25 carbon atoms. By aliphatic is meant saturated and unsaturated aliphatic and cycloaliphatic. Also, by aliphatic and aromatic is meant unsubstituted aliphatic and aromatic and substituted aliphatic and aromatic in which the substituents do not adversely affect the reactions of the precursor compounds which occur to form the N-acyl aminomethylene phosphonates and do not adversely affect the performance of the N-acyl aminomethylene phosphonates as stabilizers in waterborne coating compositions. Examples of substituents include hydroxyl and carboxy groups.

More preferably, the N-acyl aminomethylene phosphonates of the present invention have one of the following general formulae:

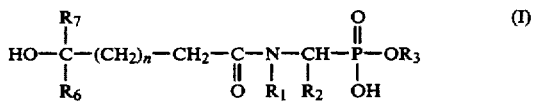

or

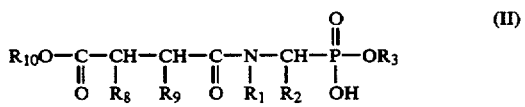

wherein $R_1$, $R_2$, and $R_3$ are as defined above; $R_6$ and $R_7$ are each hydrogen or alkyl having 1 to 10 carbon atoms, $R_8$ and $R_9$ are independently hydrogen or an aliphatic radical having 1 to 25 carbon atoms, an aromatic radical having 6 to 25 carbon atoms, or $R_8$ is connected to $R_9$ and forms a 5 or 6 membered ring. With regard to $R_8$ and $R_9$, by aliphatic is meant saturated and unsaturated aliphatic and cycloaliphatic. Also, by aliphatic and aromatic is meant unsubstituted aliphatic and aromatic and substituted aliphatic and aromatic in which the substituents do not adversely affect the reactions of the precursor compounds which occur to form the N-acyl aminomethylene phosphonates and do not adversely affect the performance of the N-acyl aminomethylene phosphonates as metallic pigment stabilizers in waterborne coating compositions. Examples of substituents are alkyl, chloro and alkoxy groups. $R_{10}$ is hydrogen or a group remaining after reaction of a hydroxyl group-containing or epoxy group-containing polymer with an acidic hydrogen of a

group; and n is an integer from 1 to 3.

The N-acyl aminomethylene phosphonates of the present invention can be prepared by reacting (i) an imine derivative having the structure:

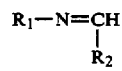

wherein $R_1$ and $R_2$ are as defined above, with (ii) phosphorous acid; and (iii) an anhydride, lactone, or monoisocyanate, forming an N-acyl aminomethylene phosphonic acid. This reaction product can be further reacted with (iv) a material selected from the group consisting of a hydroxyl group-containing polymer, an epoxy group-containing polymer, and mixtures thereof.

The imine of (i) is prepared by reacting an aldehyde with an amine. Suitable aldehydes include cyclic and acyclic aldehydes having from about 2 to about 26 carbon atoms. Examples include aliphatic, including cycloaliphatic, olefinic, cycloolefinic, and aromatic aldehydes, which may be substituted. Examples of acyclic aldehydes include, inter alia, propionaldehyde. Examples of cyclic aldehydes include cyclohexane carboxaldehyde. Examples of aromatic aldehydes include benzaldehyde and 3-nitrobenzaldehyde. Benzaldehyde is preferred.

Suitable amines are primary amines and include mono- and diamines having from about 1 to about 25 carbon atoms. Examples include aliphatic, including cycloaliphatic, olefinic, cycloolefinic, and aromatic amines, which may be substituted. Substituents include hydroxy, carboxy, and amino. Examples of aliphatic amines include lower alkyl amines such as ethylene diamine and butylamine. Fatty amines may also be used such as those available from Armak Chemical Co. as ARMEEN CD. Examples of aromatic amines include benzylamine. Fatty amines are preferred.

The reaction of the aldehyde and amine may be conducted at a temperature in the range of, for example, from about 25° C. to about 150° C. Where desired, an acid catalyst such as para-toluene sulfonic acid may be employed. The reaction may be conducted in an inert diluent or solvent such as xylene, toluene, and the like.

The relative molar proportions in which the aldehyde and amine are reacted together to form the imine of (i) are typically 1:1.

The imine of (i) is reacted with the phosphorous acid of (ii) to yield a material having the following general structure:

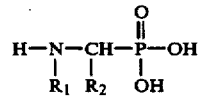

where $R_1$ and $R_2$ are as defined above. This material is further reacted with an anhydride, lactone, or monoisocyanate, forming an N-acyl aminomethylene phosphonic acid.

When (iii) is an anhydride, it may be any anhydride including those which, exclusive of the carbon atoms in the anhydride moiety, contain from about 2 to about 30 carbon atoms. Examples include cyclic and acyclic anhydrides such as aliphatic, including cycloaliphatic, olefinic and cycloolefinic anhydrides and aromatic anhydrides. Substituted aliphatic and aromatic anhydrides are also included within the definition of aliphatic and aromatic provided the substituents do not adversely affect the reactivity of the anhydride with the

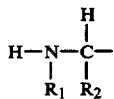

group associated with the aminomethylene phosphonic acid. Examples of substituents include chloro-, alkyl, and alkoxy- groups. Examples of acyclic anhydrides include acetic anhydride. Examples of cyclic anhydrides include succinic anhydride, methylsuccinic anhydride, dodecenyl succinic anhydride, octadecenyl succinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride and maleic anhydride. Preferably, the anhydride is carbocyclic and is of the structure:

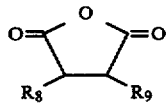

where $R_8$ and $R_9$ are as described above.

When the anhydride is acyclic as in acetic anhydride, N-acyl aminomethylene phosphonates of the following structure are formed:

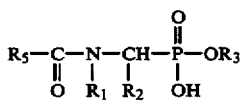

where $R_1$, $R_2$ and $R_3$ are as described above. In the case of acetic anhydride, $R_5$ is methyl.

When the anhydride is cyclic as in succinic anhydride, N-acyl aminomethylene phosphonates of the following structure are formed:

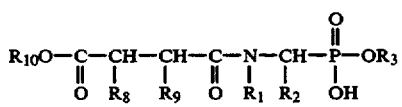

where $R_1$, $R_2$, $R_3$, $R_8$, $R_9$ and $R_{10}$ are as described above. In the case of succinic anhydride, $R_8$ and $R_9$ are both hydrogen.

When (iii) is a lactone, it may be any lactone including those which contain from about 4 to about 30 carbon atoms. Substituted lactones are also suitable, provided the substituents do not adversely affect the reactivity of the lactone with the

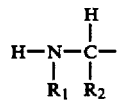

group associated with the aminomethylene phosphonic acid. Examples of substituents include chloro-, alkyl, and alkoxy- groups. Examples of suitable lactones include those of the following general formula:

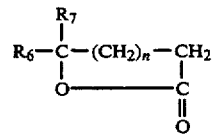

where $R_6$, $R_7$ and n are as described above. Suitable lactones include caprolactones such as gamma-caprolactone, delta-caprolactone, epsilon-caprolactone, monoalkyl caprolactrones such as methyl- and ethyl-epsilon-caprolactone, dialkyl caprolactones, such as dimethyl- and diethyl-epsilon-caprolactone, cyclohexyl-epsilon-caprolactone, and the like. Preferably, the lactone is epsilon-caprolactone.

When (iii) is a lactone, N-acyl aminomethylene phosphonates of the following structure are formed:

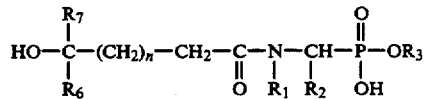

where $R_1$, $R_2$, $R_3$, $R_6$, $R_7$ and n are as defined above. In the case of epsilon-caprolactone, $R_6$ and $R_7$ are both hydrogen. The use of lactones is preferred because waterborne coating compositions containing the N-acyl aminomethylene phosphonates made with lactones also demonstrate improved humidity resistance when applied to a substrate.

When (iii) is a monoisocyanate, it is usually an organo monoisocyanate or partially capped organo polyisocyanate having on average about one free isocyanate group. The organo monoisocyanate typically contains from about 1 to about 25 carbon atoms exclusive of the carbon atoms associated with the isocyanate groups or capping groups. Substituted organo monoisocyanates are also suitable provided the substituents do not adversely affect the reactivity of the isocyanate group with the

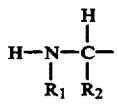

group associated with the aminomethylene phosphonic acid. Suitable monoisocyanates include phenyl isocyanate and dimethyl-m-isopropenyl benzyl isocyanate.

The organo polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Example of suitable higher polyisocyanates are triphenylmethane-4,4', 4''-triisocyanate, 1,2,4-benzene triisocyanate and polymethylene polyphenyl isocyanate.

Any suitable aliphatic, cycloaliphatic, or aromatic alkyl monoalcohol or phenolic compound may be used as a capping agent for the organo polyisocyanate including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether.

Other suitable capping agents include oximes such as methyl ethyl ketoxime, acetone oxime and cyclohexanone oxime and lactams such as epsilon-caprolactam.

The material of (iv) can be a hydroxyl group- or an epoxy group-containing polymer including addition and condensation polymers, or a mixture thereof; it preferably has a hydroxyl equivalent weight ranging from about 100 to about 1000, typically from about 200 to 400; or an epoxy equivalent weight ranging from about 200 to about 2000, typically from about 300 to 600

Examples of hydroxyl group-containing polymers which may be utilized include hydroxyl group-containing condensation polymers such as hydroxyl functional polyesters. Examples of epoxy group-containing polymers which may be utilized include polyglycidyl ethers of polyhydric alcohols such as the reaction products of epichlorohydrin or dichlorohydrin with aliphatic and cycloaliphatic alcohols such as ethylene glycol, diethylene glycol, triethylene glycol, propylene glycol, dipropylene glycol, tripropylene glycol, propane diols, butane diols, pentane diols, glycerol, 1,2,6-hexanetriol, pentaerythritol, and 2,2-bis(4-hydroxycyclohexyl)propane.

Examples of hydroxyl or epoxy group-containing addition polymers which may be utilized include hydroxyl or epoxy functional polymers or copolymers of ethylenically unsaturated monomers. Examples of suitable monomers with hydroxyl functionality include hydroxyethyl (meth)acrylate, hydroxypropyl (meth)acrylate, hydroxybutyl (meth)acrylate, and allyl alcohol. Examples of suitable monomers with epoxy functionality include glycidyl (meth)acrylate. The addition polymer may be a homopolymer of any of these hydroxyl or epoxy functional monomers, but preferably it is a copolymer of one or more of these hydroxyl or epoxy functional monomers and at least one other ethylenically unsaturated monomer which is not hydroxyl or epoxy functional. Examples of these other monomers include methyl (meth)acrylate, ethyl (meth)acrylate, butyl (meth)acrylate, styrene, and vinyl monomers such as vinyl toluene and vinyl acetate.

The preferred polymers are hydroxyl functional addition polymers and are copolymers of styrene and allyl alcohol such as those available from ARCO Chemical Company as RJ-100 or copolymers of styrene and hydroxyethyl acrylate such as those available from Pyramid Chemical Company as RJ-100 Equivalent.

When the material of (iv) is a hydroxyl group-containing polymer, N-acyl aminomethylene phosphonates of the following structure are formed:

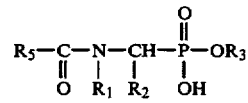

where $R_1$, $R_2$, and $R_5$ are as described above. A hydroxyl group from the polymer condenses with an acidic hydrogen from the

group associated with the N-acyl aminomethylene phosphonic acid, forming a phosphonic acid ester. Such N-acyl aminomethylene phosphonates have been shown to improve the intercoat adhesion of waterborne coating compositions when the coating compositions are applied to a substrate as a pigmented or colored base coat to which is applied a clear top coat.

The relative proportions in which the imine of (i), the phosphorous acid of (ii), the anhydride, lactone, or monoisocyanate of (iii) and the hydroxyl group-containing or epoxy group-containing polymer of (iv) are reacted together to form an N-acyl aminomethylene phosphonate of the present invention may vary widely, depending on the various components being reacted together. Typically the molar ratio is about 1:1:1:2.5. When the material of (iv) is a hydroxyl group-containing addition polymer, the ratio of moles of hydroxyl groups to moles of acidic hydrogen from the phosphonic acid group are in a range of from 5:1 to 0.5:1, preferably 2:1 to 1:1. It should be understood that, in the case where the reactants are polyfunctional, the reaction product is likely to be a statistical mixture of a number of different molecular species.

The reaction of the imine of (i), the phosphorous acid of (ii), the anhydride, lactone, or monoisocyanate of (iii) and the hydroxyl group-containing or epoxy group-containing polymer of (iv) may be conducted at a temperature in the range of, for example, from about 25° C. to about 150° C., typically in a range from about 80° C. to about 120° C. Preferably the imine of (i) is added to the phosphorous acid, followed by addition of the anhydride, lactone, or monoisocyanate of (iii) to form an N-acyl aminomethylene phosphonic acid. This reaction product is further reacted with the hydroxyl group-containing or epoxy group-containing polymer of (iv). Where desired, a catalyst for opening an epoxide ring such as a tertiary amine may be employed in the reaction of the N-acyl aminomethylene phosphonic acid and the epoxy group-containing polymer. In order to maintain fluidity of the reaction mixture, it may be advantageous to conduct the reaction in an inert, polar diluent or solvent such as 1-methoxy-2-propanol, dioxane, tetrahydrofuran and the like. Where a polar diluent or solvent is used, the reaction may be conveniently conducted at the reflux temperature of the diluent or solvent.

It has been found that incorporation of an N-acyl aminomethylene phosphonic acid or phosphonate of the present invention into a waterborne coating composition containing metallic pigment reduces or prevents gassing of the coating composition and aids in intercoat adhesion and humidity resistance when the waterborne coating composition is applied to a substrate. A waterborne coating composition of the present invention comprises a film-forming polymer, metallic pigment, an aqueous diluent medium, and an N-acyl aminomethylene phosphonate (including N-acyl aminomethylene phosphonic acid) as described above. The tendency of the pigment to react with the aqueous medium and release hydrogen gas is prevented or reduced by incorporation of an effective amount of the N-acyl aminomethylene phosphonate.

The metallic pigments used in the waterborne coating composition of the present invention include any metallic pigments which are generally used in pigmented waterborne coating compositions. Examples include metallic pigments, particularly metallic flake pigments, composed of aluminum, copper, zinc and/or brass as well as those composed of other malleable metals and alloys such as nickel, tin, silver, chrome, aluminum-copper alloy, aluminum-zinc alloy, and aluminum-magnesium alloy. Metal oxide coated mica is also included in the definition of metallic pigment. Of the aforesaid examples, aluminum flake pigment is preferred.

Various procedures may be used to incorporate an N-acyl aminomethylene phosphonate of the present invention into a waterborne coating composition of the present invention. The metallic pigment may be brought into contact with the N-acyl aminomethylene phosphonate prior to the incorporation of the pigment into the waterborne coating composition. This may be done by adding the N-acyl aminomethylene phosphonate to the pigment paste, or it may be added earlier such as during production of the pigment. Alternatively, the N-acyl aminomethylene phosphonate may be introduced into a waterborne coating composition by simply introducing it as an additional ingredient of the waterborne coating formulation, for example, during the mixing of the film-forming polymer, metallic pigment and aqueous diluent medium along with other conventional and optional ingredients such as crosslinking agents, cosolvents, thickeners, and fillers. The amount of N-acyl aminomethylene phosphonate present in the coating composition is sufficient to reduce or eliminate gassing of the metallic pigment in the aqueous medium. Typically an amount from about 1.5 to 7.0 percent by weight, usually from about 2.0 to 4.5 percent by weight, based on the weight of resin solids, is used.

The film-forming polymer can be any film-forming polymer used in waterborne coating compositions. Suitable polymers are acrylic polymers, polyesters, including alkyds, and polyurethanes.

The acrylic polymers are copolymers of one or more alkyl esters of acrylic acid or methacrylic acid optionally together with one or more other polymerizable ethylenically unsaturated monomers. These polymers may be either of the thermoplastic type or the thermosetting crosslinking type. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Other suitable copolymerizable ethylenically unsaturated monomers include vinyl aromatic materials such as styrene and vinyl toluene; nitriles such as acrylonitrile and methacrylonitrile; vinyl and vinylidene halides such as vinyl chloride and vinylidene fluoride and vinyl esters such as vinyl acetate. Preparation of the acrylic polymers via aqueous emulsion polymerization techniques as are customary in the art is suitable.

Where the polymer is of the crosslinking type, suitable functional monomers may be used in addition to the other acrylic monomers mentioned above and include, for example, acrylic acid, methacrylic acid, hydroxyalkyl acrylates, and hydroxyalkyl methacrylates. The coating composition in such cases contains a crosslinking agent such as an aminoplast. Other crosslinking agents such as polyisocyanates including blocked polyisocyanates may also be used. Also, the acrylic polymer can be prepared with N-(alkoxymethyl)acrylamides and N-(alkoxymethyl)methacrylamides which result in self-crosslinking acrylic polymers.

Besides acrylic polymers, the film-forming polymer for the coating composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane, and pentaerythritol.

Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Where it is desired to produce air-drying alkyd resins, suitable drying oil fatty acids may be used and include those derived from linseed oil, soya bean oil, tall oil, dehydrated castor oil, or tung oil.

The polyesters and preferably the alkyd resins contain a portion of free hydroxyl and/or carboxyl groups which are available for further crosslinking reactions. Suitable crosslinking agents are the amine or amide-aldehyde condensates (aminoplasts) or the polyisocyanate curing agents as are well known in the art.

Polyurethanes can also be used as the film-forming polymer of the coating composition. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product.

The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

Waterborne coating compositions used as colored base coats in color-plus-clear compositions are disclosed in U. S. Pat. No. 4,403,003, and the film-forming polymers used in preparing these base coats can be used as the waterborne coating composition of the present invention. Also, water-based polyurethanes such as those prepared in accordance with U. S. Pat. No. 4,147,679 can be used as the film-forming polymer in the waterborne coating compositions of the present invention. Further, it is possible to prepare an aqueous dispersion of a blend of acrylic and polyester and/or polyurethane materials in microparticulate form by a high stress technique using a homogenizer such as is described in U. S. Pat. No. 5,071,904. These polymers may also be used as the film-forming polymers in the waterborne coating composition of the present invention, and are preferred.

The coating composition may also include an aminoplast crosslinking agent containing methylol and/or methylol ether groups. Aminoplast condensates are obtained from the reaction of formaldehyde with an amine or amide. The most common amines or amides are melamine, urea, or benzoguanamine, and are preferred. However, condensates with other amines or amides can be used; for example, aldehyde condensates of glycoluril. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including methanol, ethanol, butanol, and hexanol.

Preferably, the aminoplasts which are used are melamine-, urea-, or benzoguanamine-formaldehyde condensates etherified with an alcohol containing from 1 to 4 carbon atoms. The aminoplast is present in amounts of about 1 to 80, preferably 10 to 50 percent by weight based on weight of resin solids in the clear film-forming composition; i.e., resin solids in the film-forming composition that are present as a pigment grind vehicle are not included in this weight ratio.

The film-forming composition will also preferably contain catalysts to accelerate the cure of the aminoplast and crosslinkable groups. Examples of suitable catalysts are acidic materials and include sulfonic acid or a substituted sulfonic acid such as paratoluene sulfonic acid. The catalyst is usually present in an amount of about 0.5 to 5.0 percent by weight, preferably about 1 to 2 percent by weight, based on weight of total resin solids. Optional ingredients such as, for example, plasticizers, surfactants, flow control agents, thixotropic agents, fillers, organic cosolvents, antioxidants, UV light absorbers and similar additives conventional in the art may be included in the composition. These ingredients are typically present at up to 25% by weight based on total resin solids.

The waterborne coating composition of the present invention may be used as the colored base coat to which is applied a clear top coat in a color-plus-clear composite coating.

The waterborne coating composition may be applied to a substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

When the waterborne coating composition is used as a base coat, a topcoat or clear coat may be applied to the base coat after the previously applied coat is flashed; that is, exposed to ambient conditions for about 1 to 20 minutes. Also, more than one base coat and multiple top coats may be applied to develop the optimum appearance.

After application of the coating composition, the coated substrate is heated to cure the coating. In the curing operation, solvents are driven off and the film-forming material of the coating is crosslinked. The heating or curing operation is usually carried out at a temperature in the range of from 160°-350° F. (71°-177° C.) but if needed, lower or higher temperatures may be used as necessary to activate crosslinking mechanisms. The thickness of the coating is usually from about 0.5-5, preferably 1.2-3 mils (30.48 to 76.2 microns).

The invention will further be described by reference to the following examples. Unless otherwise indicated, all parts are by weight.

The following examples (1-5) show the preparation of various benzaldehyde imine derivatives. Examples 6-12 show the use of these derivatives in preparing various N-acyl aminomethylene phosphonates, and examples 14-20 show the use of these N-acyl aminomethylene phosphonates as gassing inhibitors in aluminum pigment-containing waterborne coating compositions. For the purpose of comparison a waterborne base coat containing chrome-treated aluminum pigment to inhibit gassing is evaluated in example 13, as are two waterborne aluminum pigment-containing coating compositions containing gassing inhibitors of the prior art (examples 21 and 22). A waterborne aluminum pigment containing coating composition with no gassing inhibitors is also included (example 23) for comparative purposes.

EXAMPLE 1

A benzaldehyde imine derivative was prepared as follows:

| | Ingredient | Weight in Grams |
|---|---|---|
| Feed A: | benzaldehyde | 849 g |
| Feed B: | ARMEEN CD[1] | 1632 g |
| Feed C: | xylene | 66 g |
| | p-toluenesulfonic acid | 1.0 g |

[1]fatty aliphatic amine containing from 8 to 14 carbon atoms, available from Armak Chemicals Co.

A flask was charged with Feed A and stirred at room temperature under an inert nitrogen atmosphere. Feed B was then added over two hours during which time the temperature reached 52° C. Feed C was then added and the temperature was raised to 110° C. The solution was stirred at this temperature while water was removed and until infrared analysis indicated complete consumption of the benzaldehyde, The xylene was removed in vacuo to yield a tan liquid.

EXAMPLE 2

A benzaldehyde imine derivative was prepared as follows:

| | Ingredient | Weight in Grams |
|---|---|---|
| Feed A: | benzaldehyde | 982 g |
| Feed B: | benzylamine | 991 g |
| Feed C: | xylene | 103 g |

| Ingredient | Weight in Grams |
|---|---|
| p-toluenesulfonic acid | 0.98 g |

A flask was charged with Feed A and stirred at room temperature under an inert nitrogen atmosphere. Feed B was then added over 30 minutes during which time the temperature reached 76° C. Feed C was then added and the temperature was raised to 110° C. The solution was stirred at this temperature while water was removed and until infrared analysis indicated complete consumption of the benzaldehyde, The xylene was removed in vacuo to yield a tan liquid. The product was reduced to 80% solids with N-Methylpyrrolidone,

EXAMPLE 3

A benzaldehyde imine derivative was prepared as follows:

| | Ingredient | Weight in Grams |
|---|---|---|
| Feed A: | 3-nitrobenzaldehyde | 491 g |
| Feed B: | benzylamine | 348 g |
| Feed C: | xylene | 44 g |
| | p-toluenesulfonic acid | 0.4 g |

A flask was charged with Feed A and stirred at room temperature under an inert nitrogen atmosphere. Feed B was then added over 30 minutes during which time the temperature reached 44° C. Feed C was then added and the temperature was raised to 110° C. The solution was stirred at this temperature while water was removed and until infrared analysis indicated complete consumption of the benzaldehyde. The xylene was removed in vacuo to yield a tan liquid. The product was reduced to 80% solids with N-Methylpyrrolidone.

EXAMPLE 4

A benzaldehyde imine derivative was prepared as follows:

| | Ingredient | Weight in Grams |
|---|---|---|
| Feed A: | benzaldehyde | 637 g |
| Feed B: | 2-(2-aminoethoxy)ethanol | 630 g |
| Feed C: | xylene | 67 g |
| | p-toluenesulfonic acid | 0.2 g |

[1] available from Texaco Chemical Company

A flask was charged with Feed A and stirred at room temperature under an inert nitrogen atmosphere. Feed B was then added over 30 minutes during which time the temperature reached 54° C. Feed C was then added and the temperature was raised to 120° C. The solution was stirred at this temperature while water was removed and until infrared analysis indicated complete consumption of the benzaldehyde. The xylene was removed in vacuo to yield a tan liquid.

EXAMPLE 5

A benzaldehyde imine derivative was prepared as follows:

| | Ingredient | Weight in Grams |
|---|---|---|
| Feed A: | benzaldehyde | 1061 g |
| Feed B: | ethylene diamine | 300 g |
| Feed C: | xylene | 71 g |

| Ingredient | Weight in Grams |
|---|---|
| p-toluenesulfonic acid | 0.10 g |

A flask was charged with Feed A and stirred at room temperature under an inert nitrogen atmosphere. Feed B was then added over 30 minutes during which time the temperature reached 60° C. Feed C was then added and the temperature was raised to 120° C. The solution was stirred at this temperature while water was removed and until infrared analysis indicated complete consumption of the benzaldehyde. The xylene was removed in vacuo to yield a tan solid.

EXAMPLE 6

A gassing inhibitor was prepared as follows:

| | Ingredient | Weight in Grams |
|---|---|---|
| Feed A: | phosphorous acid | 32.8 g |
| Feed B: | benzaldehyde imine derivative of Example 1 | 124 g |
| Feed C: | methylhexahydrophthalic anhydride | 67.3 g |
| Feed D: | ARCO RJ-100[1] | 293 g |
| | N-Methyl pyrrolidone | 258 g |

[1] copolymer of 80.2% styrene and 19.2% allyl alcohol having a hydroxyl equivalent weight of 293, available from ARCO Chemical Co.

A flask was charged with Feed A and heated to 80° C. under an inert nitrogen atmosphere. Feed B was then added over 1.5 hours. Fifteen minutes after initiation of Feed B, Feed C was added over 1.5 hours. After the additions were complete, the temperature was raised to 120° C. and held for seven hours. Feed D was added. The temperature was then raised to 180° C. and held until the acid value was 62. The product was reduced to a solids content of 50% with propylene glycol monopropyl ether, available as PROPASOL P from Union Carbide Company. The final product had an acid value of 45 and a number average molecular weight of 2450 as determined by gel permeation chromatography using a polystyrene standard.

EXAMPLE 7

A gassing inhibitor was prepared as follows:

| | Ingredient | Weight in Grams |
|---|---|---|
| Feed A: | phosphorous acid | 41 g |
| Feed B: | benzaldehyde imine derivative of Example 2 | 122 g |
| Feed C: | epsilon-caprolactone | 57 g |
| Feed D: | ARCO RJ-100 | 246 g |
| | N-Methylpyrrolidone | 104 g |

A flask was charged with Feed A and heated to 80° C. under an inert nitrogen atmosphere. Feed B was then added over 1.5 hours. Fifteen minutes after initiation of Feed B, Feed C was added over 1.5 hours. After the additions were complete, the temperature was raised to 120° C. and held for eight hours. Feed D was added. The temperature was then raised to 180° C. and held until the acid value was 71. The product was reduced to a solids content of 50% with PROPASOL P. The final product had an acid value of 53 and a number average molecular weight of 2300 as determined by gel permeation chromatography using a polystyrene standard.

EXAMPLE 8

A gassing inhibitor was prepared as follows:

| | Ingredient | Weight in Grams |
|---|---|---|
| Feed A: | phosphorous acid | 41 g |
| | N-Methylpyrrolidone | 227 g |
| Feed B: | benzaldehyde imine derivative of Example 2 | 122 g |
| Feed C: | methyl hexahydrophthalic anhydride | 84 g |
| Feed D: | Pyramid RJ-100 Equivalent[1] | 256 g |

A flask was charged with Feed A and heated to 80° C. under an inert nitrogen atmosphere. Feed B was then added over 1.5 hours. Fifteen minutes after initiation of Feed B, Feed C was added over 1.5 hours. After the additions were complete, the temperature was raised to 120° C. and held for four hours. Feed D was then added. The temperature was raised to 180° C. and held until the acid value was 84. The product was cooled and reduced to a solids content of 46.2% with PROPASOL P. The final product had an acid value of 65, a Gardner-Holt viscosity of J, and a number average molecular weight of 3266 as determined by gel permeation chromatography using a polystyrene standard.

EXAMPLE 9

A gassing inhibitor was prepared as follows:

| | Ingredient | Weight in Grams |
|---|---|---|
| Feed A: | phosphorous acid | 41 g |
| | N-Methylpyrrolidone | 118 g |
| Feed B: | benzaldehyde imine derivative of Example 2 | 122 g |
| Feed C: | methyl hexahydrophthalic anhydride | 84 g |
| Feed D: | styrene/GMA[1] | 261 g |

[1] copolymer of styrene and glycidyl methacrylate in a 42.3:57.7 weight ratio, with a number average molecular weight of 2500.

A flask was charged with Feed A and heated to 80° C. under an inert nitrogen atmosphere. Feed B was then added over 1.5 hours. Fifteen minutes after initiation of Feed B, Feed C was added over 1.5 hours. After the additions were complete, the temperature was raised to 120° C. and held for two hours. The mixture was cooled to 80° C. and Feed D was then added. The temperature was raised to 90° C. and held until the epoxy was completely consumed. The product was cooled and reduced to a solids content of 54.7% with PROPASOL P. The final product had an acid value of 78.5 and a number average molecular weight of 3220 as determined by gel permeation chromatography using a polystyrene standard.

EXAMPLE 10

A gassing inhibitor was prepared as follows:

| | Ingredient | Weight in Grams |
|---|---|---|
| Feed A: | phosphorous acid | 41 g |
| | N-Methylpyrrolidone | 235 g |
| Feed B: | benzaldehyde imine derivative of Example 3 | 150 g |
| Feed C: | methyl hexahydrophthalic anhydride | 84 g |
| Feed D: | Pyramid RJ-100 Equivalent | 256 g |

A flask was charged with Feed A and heated to 80° C. under an inert nitrogen atmosphere. Feed B was then added over 1.5 hours. Fifteen minutes after initiation of Feed B, Feed C was added over 1.5 hours. After the additions were complete, the temperature was raised to 120° C. and held for seven hours. Feed D was added. The temperature was then raised to 180° C. and held until the acid value was 77. The product was reduced to a solids content of 50% with PROPASOL P. The final product had an acid value of 59.4 and a number average molecular weight of 908 as determined by gel permeation chromatography using a polystyrene standard.

EXAMPLE 11

A gassing inhibitor was prepared as follows:

| | Ingredient | Weight in Grams |
|---|---|---|
| Feed A: | phosphorous acid | 41 g |
| | N-Methylpyrrolidone | 237 g |
| Feed B: | benzaldehyde imine derivative of Example 4 | 193 g |
| Feed C: | methyl hexahydrophthalic anhydride | 84 g |
| Feed D: | Pyramid RJ-100 Equivalent | 256 g |

A flask was charged with Feed A and heated to 80° C. under an inert nitrogen atmosphere. Feed B was then added over 1.5 hours. Fifteen minutes after initiation of Feed B, Feed C was added over 1.5 hours. After the additions were complete, the temperature was raised to 120° C. and held for two hours. Feed D was added. The temperature was then raised to 180° C. and held until the acid value was 77. The product was reduced to a solids content of 50% with PROPASOL P. The final product had an acid value of 59.4 and a number average molecular weight of 614 as determined by gel permeation chromatography using a polystyrene standard.

EXAMPLE 12

A gassing inhibitor was prepared as follows:

| | Ingredient | Weight in Grams |
|---|---|---|
| Feed A: | phosphorous acid | 41 g |
| | N-Methylpyrrolidone | 282 g |
| Feed B: | benzaldehyde imine derivative of Example 2 | 122 g |
| Feed C: | methyl hexahydrophthalic anhydride | 84 g |
| Feed D: | ARCO RJ-100 | 366 g |

A flask was charged with Feed A and heated to 80° C. under an inert nitrogen atmosphere. Feed B was then added over 1.5 hours. Fifteen minutes after initiation of Feed B, Feed C was added over 1.5 hours. After the additions were complete, the temperature was raised to 120° C. and held for four hours. Feed D was added. The temperature was then raised to 180° C. and held until the acid value was 68. The product was reduced to a solids content of 50% with PROPASOL P. The final product had an acid value of 51 and a number average molecular weight of 3300 as determined by gel permeation chromatography using a polystyrene standard.

EXAMPLE 13

A silver base coat composition was prepared which is available from PPG Industries Inc. as BWB-9021. This base coat contains a chrome-treated aluminum pigment to inhibit gassing.

EXAMPLES 14–23

The silver base coat composition of Example 13 was prepared, replacing the chrome-treated aluminum pigment with medium size aluminum flake pigment available from TOYO Aluminum K. K. and a gassing inhibitor as follows:

| Ingredient | | Parts by Weight |
|---|---|---|
| Premix 1: | Ethylene glycol monohexyl ether | 22.2 |
| | Diethylene glycol monobutyl ether | 7.1 |
| | Propylene glycol monopropyl ether | 3.4 |
| | Polypropylene glycol[1] | 12.0 |
| | CYMEL 322[2] | 31.32 |
| | TINUVIN 1130[3] | 3.2 |
| | Gassing inhibitor | see tables below |
| | Untreated aluminum[4] | 29.4 |
| Premix 2: | Latex[5] | 123.3 |
| | Deionized water | 30 |
| | Shell Sol 71[6] | 6.0 |
| | Dimethylethanolamine, 50% in deionized water | 2 |

[1]Molecular weight 425, available from ARCO Chemicals Co.
[2]Partially iminated melamine formaldehyde resin available from CYTEK Industries, Inc.
[3]substituted benzotriazole UV light stabilizer available from Ciba Geigy Corporation
[4]available from TOYO Aluminum K. K. as 8260 NAR aluminum paste
[5]Prepared according to U.S. Pat. No. 5,071,904, see Example I, Part A.
[6]Mineral spirits available from Shell Chemical Co.

Premixes 1 and 2 were prepared separately and Premix 2 was added to Premix 1 under agitation. The final composition had a solids content of 38%, a pH of 8.7 to 8.9, and a viscosity of 24 seconds, measured using a #4 Ford cup.

| Example | Gassing inhibitor | Amount, g/100 g resin solids[1] |
|---|---|---|
| 13 | none (chrome treated Al) | — |
| 14 | Example 6 | 4.2 |
| 15 | Example 7 | 4.2 |
| 16 | Example 8 | 2.3 |
| 17 | Example 9 | 4.3 |
| 18 | Example 10 | 2.3 |
| 19 | Example 11 | 2.3 |
| 20 | Example 12 | 2.3 |
| 21 | Comparative #1[2] | 4.2 |
| 22 | Comparative #2[3] | 2.3 |
| 23 | Untreated Aluminum | 0 |

[1]amounts added were optimized with respect to gas evolution and humidity resistance of coating composition.
[2]Gas inhibiting agent comprising 1 mole styrene/allyl alcohol copolymer, 3 moles p-tert-amyl phenol, and 3 moles phosphoric acid, prepared according to U.S. Pat. No. 4,675,358, Example 1. 4.2 g/100 g resin solids is the level recommended by the manufacturer.
[3]Gas inhibiting agent comprising 0.5 mole EPON 828, 1 mole phenyl glycidyl ether, and 1 mole orthophosphoric acid, prepared according to U.S. Pat. No. 4,621,112, Example 1.

The base coat compositions of Examples 13 to 23 were tested for gassing resistance as follows: The base coats were loaded into Erlenmeyer flasks immersed in a constant temperature bath (40° C.). Tubes connected the individual flasks to inverted gas burettes filled with water. The amount of gas evolved from each base coat was measured for seven days in milliliters by the displacement of water in the burette.

The base coats were spray applied in two coats to electrocoated steel panels at a temperature of about 75° F. (23.9° C.) and a relative humidity of about 60%. A ninety second flash time was allowed between the two base coat applications. After the second base coat application, a prebake time of approximately five minutes was allowed at 200° F. (93.3° C.) before the application of an acid-cured polyepoxy clear coating composition available from PPG Industries, Inc., as DIAMOND COAT. See U. S. Pat. No. 5,196,485. The clear coating composition was applied to a base coated panel in two coats with a ninety second flash at 75° F. (23.9° C.) allowed between coats. The composite coating was allowed to air flash at 75° F. (23.9° C.) for ten to fifteen minutes and to flash at 140° F. (60° C.) for ten to fifteen minutes before heating to 285° F. (140.6° C.) for 30 minutes to cure both the base coat and clear coat. The panels were cured in a horizontal position.

The cured film was evaluated for gloss, distinctness of image (DOI), and cross-hatch adhesion both initially after cure and after humidity testing.

Gloss was measured at a 20° angle with a Glossmeter commercially available from Hunter Lab.

DOI was measured with a Glow Box Model GB11-87 commercially available from I²R in Cheltenham, Penn.

The humidity resistance of the coated panels was tested by keeping the coated panels in a humidity chamber operating at 100 percent relative humidity for 120 hours at 120° F. (48.9° C.).

Intercoat adhesion was measured using test method ASTM D 3359 with a paint adhesion test kit commercially available from Paul N. Gardner Company, Inc., by scribing a coated substrate with a "cross-hatch" pattern and securely applying a piece of adhesive tape onto the scribe. The tape was then removed and the substrate examined for removal of the coating layers. A rating is given based on the area and layers of coating material removed by the tape, ranging from 0 ("complete failure of coatings") to 5 ("no removal").

The properties of the coatings of Examples 13 to 23 are reported in Tables I and II below. Table II reports properties before/after humidity testing.

TABLE I

| Example | Hydrogen evolved, ml |
|---|---|
| 13 (chrome treated Al) | 5 |
| 14 | 7 |
| 15 | 13 |
| 16 | 12 |
| 17 | 12 |
| 18 | 5 |
| 19 | 34 |
| 20 | 5 |
| 21 (Comparative) | 10 |
| 22 (Comparative) | 72 |
| 23 (Untreated Al) | >200 |

Results shown in Table I indicate that the gassing inhibitors of the present invention eliminate gassing as effectively as chrome treated aluminum and the gassing inhibitors of the prior art.

TABLE II

| Example | Adhesion | Gloss | DOI |
|---|---|---|---|
| 13 (chrome treated Al) | 5/3− | 83/79 | 49/45 |
| 14 | 5/5− | 79/87 | 77/80 |
| 15 | 5/3+ | 88/82 | 80/82 |
| 16 | 5/4+ | 85/85 | 76/80 |
| 17 | 5/5 | 75/88 | 80/78 |
| 18 | 5/3+ | 87/86 | 82/81 |
| 19 | 5/4+ | 85/85 | 77/78 |
| 20 | 4+/4+ | 88/87 | 80/84 |
| 21 (Comparative) | 5/4− | 88/81 | 75/82 |
| 22 (Comparative) | 5/4+ | 87/87 | 84/82 |
| 23 (Untreated Al)[1] | — | — | — |

[1]Paint was unstable and could not be sprayed.

As shown in Table II, coating compositions containing the gassing inhibitors of the present invention have better adhesion, gloss, and DOI properties than the coating composition containing chrome treated aluminum.

We claim:

1. An N-acyl aminomethylene phosphonate having a group defined by the following general formula:

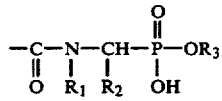

wherein $R_1$ is hydrogen, an aliphatic radical having 1 to 25 carbon atoms, or an aromatic radical having 6 to 25 carbon atoms; $R_2$ is hydrogen, an aliphatic radical having 1 to 25 carbon atoms, or an aromatic radical having 6 to 25 carbon atoms; and $R_3$ is a group remaining after reaction of a hydroxyl group-containing or epoxy group-containing polymer with an acidic hydrogen of a

group.

2. An N-acyl aminomethylene phosphonate of the following general formula:

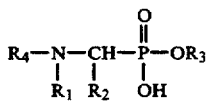

wherein $R_1$ is hydrogen, an aliphatic radical having 1 to 25 carbon atoms, or an aromatic radical having 6 to 25 carbon atoms; $R_2$ is hydrogen, an aliphatic radical having 1 to 25 carbon atoms, or an aromatic radical having 6 to 25 carbon atoms; $R_3$ is a group remaining after reaction of a hydroxyl group-containing or epoxy group-containing polymer with an acidic hydrogen of a

group; and $R_4$ is a group remaining after reaction of a member selected from the group consisting of an anhydride, a lactone or a monoisocyanate, including mixtures thereof, with the amino hydrogen of a

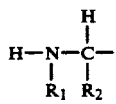

group, where $R_1$ and $R_2$ are as defined above.

3. The N-acyl aminomethylene phosphonate of claim 2 in which the member is an anhydride.

4. The N-acyl aminomethylene phosphonate of claim 2 in which the member is a lactone.

5. An N-acyl aminomethylene phosphonate of the following general formula:

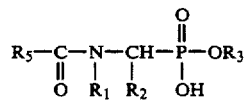

wherein $R_1$ is hydrogen, alkyl having 1 to 25 carbon atoms, or aryl having 6 to 25 carbon atoms; $R_2$ is hydrogen, alkyl having 1 to 25 carbon atoms, or aryl having 6 to 25 carbon atoms; $R_3$ is a group remaining after reaction of a hydroxyl group-containing or epoxy group-containing polymer with an acidic hydrogen of a

group; and $R_5$ is an aliphatic radical having 1 to 25 carbon atoms, an aromatic radical having 6 to 25 carbon atoms, or an aliphatic or an aromatic substituted amino radical in which the aliphatic group contains from 1 to 25 carbon atoms and the aromatic group contains 6 to 25 carbon atoms.

6. An N-acyl aminomethylene phosphonate of the following general formula:

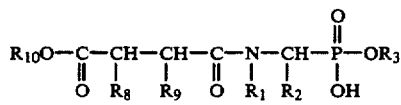

where $R_1$ is hydrogen, an aliphatic radical having 1 to 25 carbon atoms, or an aromatic radical having 6 to 25 carbon atoms; $R_2$ is hydrogen, an aliphatic radical having 1 to 25 carbon atoms, or an aromatic radical having 6 to 25 carbon atoms; $R_3$ is a group remaining after reaction of a hydroxyl group-containing or epoxy group-containing polymer with an acidic hydrogen of a

group; $R_8$ and $R_9$ are independently hydrogen or an aliphatic radical having 1 to 25 carbon atoms, or an aromatic radical having 6 to 25 carbon atoms, or $R_8$ is connected to $R_9$ and forms a 5 or 6 membered ring; and $R_{10}$ is hydrogen or a group remaining after reaction of a hydroxyl group-containing or epoxy group-containing polymer with an acidic hydrogen of a

group.

7. An N-acyl aminomethylene phosphonate of the following general formula:

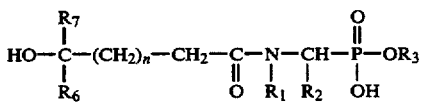

where $R_1$ is hydrogen, an aliphatic radical having 1 to 25 carbon atoms, or an aromatic radical having 6 to 25 carbon atoms; $R_2$ is hydrogen, an aliphatic radical having 1 to 25 carbon atoms, or an aromatic radical having 6 to 25 carbon atoms; and $R_3$ is a group remaining after reaction of a hydroxyl group-containing or epoxy group-containing polymer with an acidic hydrogen of a

group; $R_6$ and $R_7$ are each hydrogen or alkyl having 1 to 10 carbon atoms; and n is an integer from 1 to 3.

8. A waterborne coating composition comprising a film-forming polymer and a metallic pigment which is normally reactive with water or moisture to release hydrogen gas, stabilized against gassing by addition into the waterborne coating composition of an effective amount of an N-acyl aminomethylene phosphonate of the following general formula:

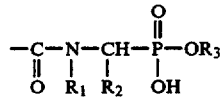

wherein $R_1$ is hydrogen, an aliphatic radical having 1 to 25 carbon atoms, or an aromatic radical having 6 to 25 carbon atoms; $R_2$ is hydrogen, an aliphatic radical having 1 to 25 carbon atoms, or an aromatic radical having 6 to 25 carbon atoms; and $R_3$ is hydrogen or a group remaining after reaction of a hydroxyl group-containing or epoxy group-containing polymer with an acidic hydrogen of a

group.

9. A waterborne coating composition comprising a film-forming polymer and a metallic pigment which is normally reactive with water or moisture to release hydrogen gas, stabilized against gassing by addition into the waterborne coating composition of an effective amount of an N-acyl aminomethylene phosphonate of the following general formula:

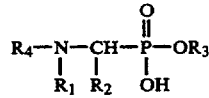

wherein $R_1$ is hydrogen, an aliphatic radical having 1 to 25 carbon atoms, or an aromatic radical having 6 to 25 carbon atoms; $R_2$ is hydrogen, an aliphatic radical having 1 to 25 carbon atoms, or an aromatic radical having 6 to 25 carbon atoms; $R_3$ is hydrogen or a group remaining after reaction of a hydroxyl group-containing or epoxy group-containing polymer with an acidic hydrogen of a

group; and $R_4$ is a group remaining after reaction of a member selected from the group consisting of an anhydride, a lactone or a monoisocyanate, including mixtures thereof, with the amino hydrogen of a

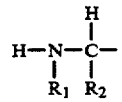

group, where $R_1$ and $R_2$ are as defined above.

10. The waterborne coating composition of claim 9 in which the member is an anhydride.

11. The waterborne coating composition of claim 9 in which the member is a lactone.

12. A waterborne coating composition comprising a film-forming polymer and a metallic pigment which is normally reactive with water or moisture to release hydrogen gas, stabilized against gassing by addition into the waterborne coating composition of an effective amount of an N-acyl aminomethylene phosphonate of the following general formula:

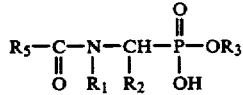

wherein $R_1$ is hydrogen, an aliphatic radical having 1 to 25 carbon atoms, or an aromatic radical having 6 to 25 carbon atoms; $R_2$ is hydrogen, an aliphatic radical having 1 to 25 carbon atoms, or an aromatic radical having 6 to 25 carbon atoms; $R_3$ is hydrogen or a group remaining after reaction of a hydroxyl group-containing or epoxy group-containing polymer with an acidic hydrogen of a

group; and $R_5$ is an aliphatic radical having 1 to 25 carbon atoms, an aromatic radical having 6 to 25 carbon atoms, or an aliphatic or an aromatic substituted amino radical in which the aliphatic group contains 1 to 25 carbon atoms and the aromatic group contains 6 to 25 carbon atoms.

13. The waterborne coating composition of claim 8 wherein the N-acyl aminomethylene phosphonate is of the following general formula:

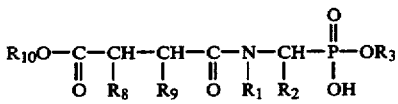

where $R_8$ and $R_9$ are independently hydrogen or an aliphatic radical having 1 to 25 carbon atoms, or an aromatic radical having 6 to 25 carbon atoms, or $R_8$ is connected to $R_9$ and forms a 5 or 6 membered ring; and $R_{10}$ is hydrogen or a group remaining after reaction of a hydroxyl group-containing or epoxy group-containing polymer with an acidic hydrogen of a

group.

14. The waterborne coating composition of claim 8 wherein the N-acyl aminomethylene phosphonate is of the following general formula:

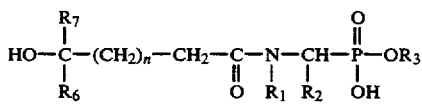

where $R_6$ and $R_7$ are each hydrogen or alkyl having 1 to 10 carbon atoms and n is an integer from 1 to 3.

* * * * *